(12) United States Patent
Young

(10) Patent No.: US 8,098,826 B2
(45) Date of Patent: *Jan. 17, 2012

(54) QKD SYSTEM LASER AUTOCALIBRATION BASED ON BIT-ERROR RATE

(75) Inventor: Jonathan Young, Newburyport, MA (US)

(73) Assignee: MagiQ Technologies, Inc., Somerville, MA (US)

( * ) Notice: Subject to any disclaimer, the term of this patent is extended or adjusted under 35 U.S.C. 154(b) by 2005 days.

This patent is subject to a terminal disclaimer.

(21) Appl. No.: 11/110,031

(22) Filed: Apr. 20, 2005

(65) Prior Publication Data

US 2006/0239463 A1   Oct. 26, 2006

(51) Int. Cl.
   H04L 9/08        (2006.01)
   H04L 9/00        (2006.01)
   H04L 29/06       (2006.01)
   H04K 1/00        (2006.01)

(52) U.S. Cl. ........ 380/278; 380/256; 380/263; 380/283; 713/150

(58) Field of Classification Search .......... 380/278, 380/256, 263, 283; 713/150
   See application file for complete search history.

(56) References Cited

U.S. PATENT DOCUMENTS

| | | | |
|---|---|---|---|
| 4,469,942 A | | 9/1984 | Srivastava et al. |
| 5,307,410 A | | 4/1994 | Bennett |
| 6,236,488 B1 | | 5/2001 | Shimizu et al. |
| 6,438,234 B1 | | 8/2002 | Gisin |
| 6,445,478 B2 | | 9/2002 | Shimizu et al. |
| 6,462,825 B1 | | 10/2002 | Wiebesick et al. |
| 6,529,601 B1 * | | 3/2003 | Townsend .......... 380/278 |
| 7,406,173 B2 * | | 7/2008 | Ichimura et al. ....... 380/28 |
| 7,492,904 B2 * | | 2/2009 | Young ............... 380/278 |
| 7,577,254 B2 * | | 8/2009 | Vig et al. ............. 380/256 |
| 2003/0169880 A1 * | | 9/2003 | Nambu et al. ......... 380/256 |
| 2004/0161109 A1 | | 8/2004 | Trifonov | |

FOREIGN PATENT DOCUMENTS

| | | |
|---|---|---|
| GB | 2427337 A * | 12/2006 |
| WO | WO 9404889 | 3/1994 |

OTHER PUBLICATIONS

Chip Elliott, David Pearson, Gregory Troxel, "Quantum cryptography in practice", Aug. 2003, SIGCOMM '03: Proceedings of the 2003 conference on Applications, technologies, architectures, and protocols for computer communications Publisher: ACM; pp. 227-238.*

Stucki et al, "Photon counting for quantum key distribution with Peltier cooled InGaAs/InP", http://arxiv.org quant-ph/0106007v1, pp. 1-18, Jun. 1, 2001.

* cited by examiner

*Primary Examiner* — Eleni Shiferaw
*Assistant Examiner* — Courtney Fields
(74) *Attorney, Agent, or Firm* — Opticus IP Law PLLC

(57) ABSTRACT

A method of autocalibrating the timing of the laser in a quantum key distribution (QKD) system is disclosed. The laser generates photon signals in response to a laser gating signals from a controller. The method includes first performing a laser gate scan to establish the optimum laser gating signal arrival time corresponding to an optimum bit-error rate when exchanging photon signals between encoding stations of the QKD system. Once the optimum laser gating signal arrival time is determined, the laser gate scan is terminated and laser gate dithering is initiated. Laser gate dithering involves varying the arrival time of the laser gating signal around the optimum value of the arrival time. Laser gate dithering provides minor adjustments to the laser gating signal arrival time to ensure that the system operates at or near the optimum bit-error rate.

20 Claims, 3 Drawing Sheets

QKD SYSTEM LASER AUTOCALIBRATION BASED ON BIT-ERROR RATE

CROSS-REFERENCE TO RELATED APPLICATIONS

The present invention is related to PCT Patent Application Serial No. PCT/US05/06909, entitled "Laser autocalibration for QKD systems," filed on Mar. 3, 2005, and U.S. patent application Ser. No. 11/110,227, entitled "QKD system detector autocalibration based on bit-error rate," filed on Apr. 20, 2005.

TECHNICAL FIELD OF THE INVENTION

The present invention relates to and has industrial utility in the field of quantum cryptography, and in particular relates to and has industrial utility in connection with apparatus and methods of autocalibrating a quantum key distribution (QKD) system to maintain optimum system performance.

BACKGROUND ART

Quantum key distribution (QKD) involves establishing a key between a sender ("Alice") and a receiver ("Bob") by using weak (e.g., 0.1 photon on average) optical signals ("photon signals") transmitted over a "quantum channel." The security of the key distribution is based on the quantum mechanical principle that any measurement of a quantum system in an unknown state will modify its state. As a consequence, an eavesdropper ("Eve") that attempts to intercept or otherwise measure the photon signals will introduce errors into the transmitted signals, thereby revealing her presence.

The general principles of quantum cryptography were first set forth by Bennett and Brassard in their article "Quantum Cryptography: Public key distribution and coin tossing," *Proceedings of the International Conference on Computers, Systems and Signal Processing*, Bangalore, India, 1984, pp. 175-179 (IEEE, New York, 1984), and in the article by Bennett et al., "Experimental Quantum Cryptography," *J. Cryptology*, (1992) 5: 3-28, which articles are incorporated by reference herein. A specific QKD system is described in U.S. Pat. No. 5,307,410 to Bennett (the '410 patent), which patent is incorporated by reference herein.

The above-mentioned publications and the '410 patent each describe a so-called "one-way" QKD system wherein Alice randomly encodes the polarization or phase of the photon signals, and Bob randomly measures the polarization or phase of the photon signals. The one-way system described in the '410 patent is based on two optical fiber Mach-Zehnder interferometers. Respective parts of the interferometric system are accessible by Alice and Bob so that each can control the phase of the interferometer. The signals (pulses) sent from Alice to Bob are time-multiplexed and follow different paths. As a consequence, the interferometers need to be actively stabilized during transmission to compensate for thermal drifts.

U.S. Pat. No. 6,438,234 to Gisin (the '234 patent), which patent is incorporated herein by reference, discloses a so-called "two-way" QKD system that is autocompensated for polarization and thermal variations. Thus, the two-way QKD system of the '234 patent is less susceptible to environmental effects than a one-way system.

When operating a commercial QKD system, multiple variables need to be aligned in time and then maintained aligned for optimum system performance. For example, in a commercial QKD system one or more single-photon detectors (SPDs) are gated with a gating signal from a controller to synchronize the detection of optical pulses with expected pulse arrival times. However, once the system is set up, the timing drifts due to various systemic and environmental factors. This causes the photon count to drop, which in turn leads to a reduction in the transmission rate of the system, and to an increase in the bit-error rate (BER)—i.e., to less-than-optimum system performance.

While laboratory and prototype QKD systems can be adjusted to account for system drifts under very controlled and artificial conditions, making the necessary adjustments to maintain optimum or near-optimum performance of a commercial QKD system in the field is a far more daunting endeavor. And, unlike with a laboratory or prototype QKD system, end-users of commercial QKD systems have an expectation that their QKD system will automatically run in an optimum state with minimal or no operator intervention.

SUMMARY OF THE INVENTION

A first aspect of the invention is a method of autocalibrating a QKD system having two operably coupled encoding stations, where one of the encoding stations includes a laser operably coupled to a controller. The method includes performing a laser gate scan by sending a laser gating signal S0 from the controller to the laser and varying the arrival time T of the signal over a first select range R1. The method also includes determining an optimum timing $T_{MIN}$ for the laser gating signal that corresponds to an optimum BER (e.g., a minimum, $BER_{MIN}$) when exchanging photon signals between encoding stations of the QKD system. The method further includes performing laser gating signal dithering by varying the arrival time T over a second select range R2 surrounding $T_{MIN}$ to maintain the BER at an optimum value, such as at or near the minimum $BER_{MIN}$.

A second aspect of the invention is method of exchanging a key in a quantum key distribution (QKD) system having two operably coupled encoding stations, and a laser coupled to a controller in one of the encoding stations. The method includes using the laser to generate photon signals and exchanging the photon signals between the encoding stations in the QKD system to establish a BER. The method also includes performing a first laser gate scan. The first laser gate scan is accomplished by sending laser gating signals S0 from the controller to the laser over a range R1 of laser gating signal arrival times to establish a first optimum arrival time $T_{MIN}$ for the laser gating signal corresponding to a first optimum BER. The method also includes terminating the first laser gate scan when the first $T_{MIN}$ is established, and then performing a first laser gate dither. The first laser gate dither is accomplished by the controller altering the arrival times T of the (optimum) laser gating signals over a range R2 of arrival times about the first $T_{MIN}$ to maintain either the first optimum BER (say, $BER_{MIN}$) or a different optimum BER (say, $BER'_{MIN}$) over the range R2, where R2<R1.

A third aspect of the invention is a continuation of the method of the second aspect of the invention described immediately above, wherein performing the laser gate dither results in a new optimum arrival time $T'_{MIN}$. The method of the third aspect of the invention includes terminating the laser gate dither, performing a second laser gate scan, terminating the second laser gate scan, and then performing a second laser gate dither to automatically reestablish an optimum BER, and thus optimum (or near-optimum) QKD system performance.

These and other aspects of the invention are described in greater detail below.

Figure 1:
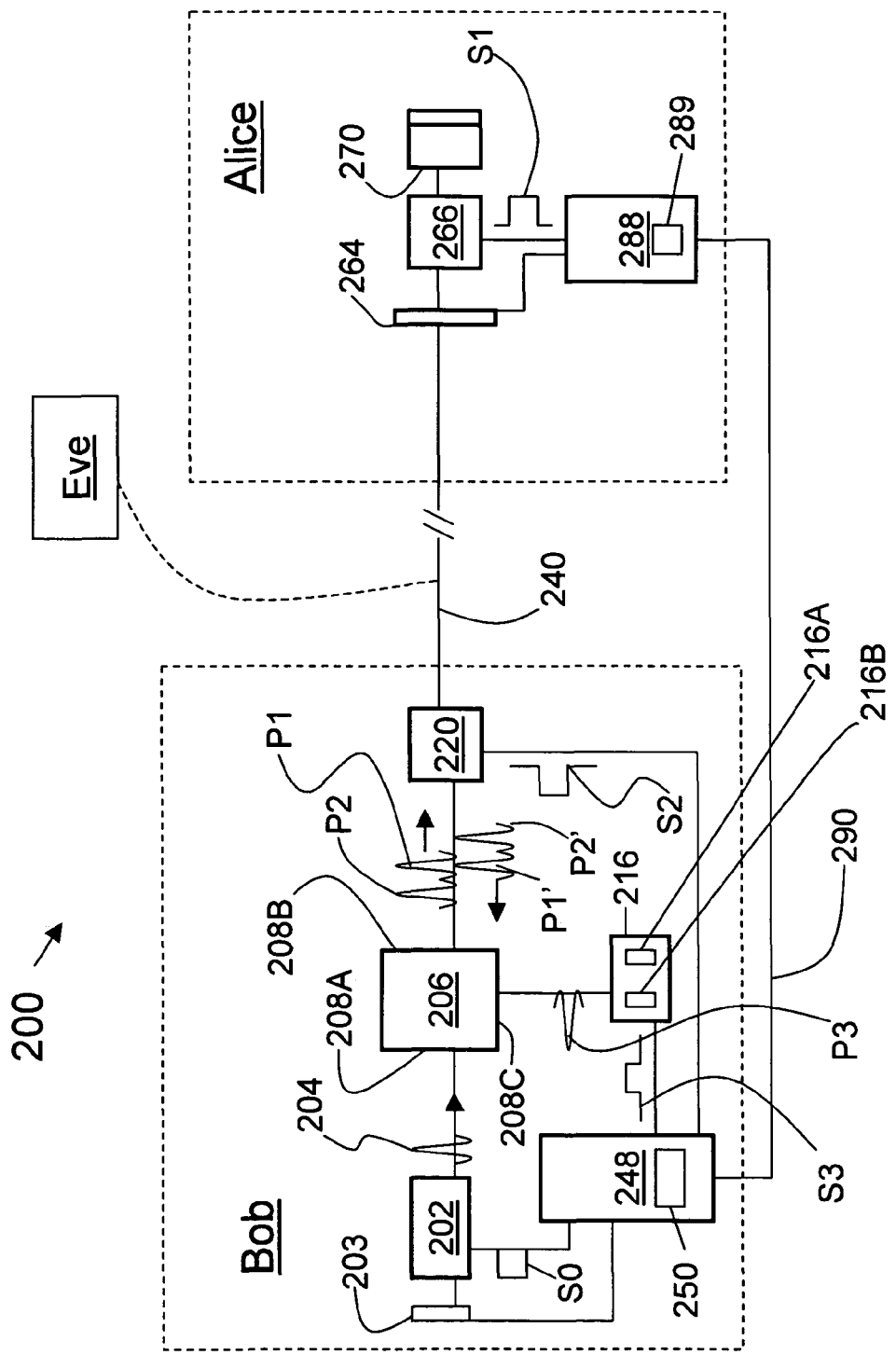
FIG. 1 is an example embodiment of a two-way QKD system suitable for implementing the method of the present invention.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

DETAILED DESCRIPTION OF THE INVENTION

The present invention relates to methods of performing autocalibration of a QKD system to maintain optimum system performance. In particular, the present invention involves performing a scan of the laser gating signal timing to determine the optimum laser gating signal position (timing), as well as performing laser gating signal timing dithering in order to maintain the optimum laser gating signal timing during the QKD system's operation. This results in the optimum (e.g., smallest) bit-error rate, which generally corresponds to the optimum operation of the QKD system as a whole.

In an example embodiment, the invention is carried out by a programmed controller so that the system can be maintained as operating in an ideal or near-ideal state without operator intervention. Such autocalibration is important for a commercially viable QKD system.

The invention is applicable to one-way, two-way; ring topology and n-way QKD systems that use either polarization encoding or phase encoding, and that use one or more single-photon detectors. The invention is described below in connection with an example embodiment of a two-way QKD system using phase-encoding and a single-photon detector unit having two detectors. This choice of QKD system is merely for the sake of illustrating the methods of the present invention, and is not intended as limiting.

Also, in the description below, a "gating signal" is a signal that activates the element to which the signal is sent, wherein the activation of the element corresponds to the duration (width W) of the signal. Thus, the laser gating signal activates the laser for the duration (i.e., width) of the laser gating signal, wherein activation starts at the leading edge of the pulse and ends at the trailing edge of the pulse. In the case of the pulsed laser, the optical pulse is emitted from the laser at some point during the width of the laser gating signal (say, at the rising edge of the gating signal). The resulting optical pulse may have an optical pulse width smaller than that of the width of the laser gating signal.

Also, in the discussion below, the laser generates optical pulses used to exchange keys between the two encoding stations of the QKD system and to establish a BER. In a preferred embodiment, the laser pulses are attenuated after they leave the laser to form the quantum pulses (referred to below as "photon signals") that have, on average, one photon or less. Thus, in the description below and in the claims, the phrase "photon signals generated by the laser" and similar phrases are understood to include the case where the laser generates relatively strong optical pulses that are later attenuated (e.g., via a variable attenuator) to form the photon signals, as well as the case wherein the laser is a single-photon source or is otherwise included in a single-photon source.

QKD System Embodiment

FIG. 1 is a schematic diagram of an example embodiment of a folded QKD system 200 to which the methods of the present invention are aptly suited. System 200 includes two operably coupled key encoding ("encoding") stations: a transmitting/receiving station Bob and a reflecting station Alice, referred to hereinafter simply as "Bob" and "Alice."

Bob

With continuing reference to FIG. 1, Bob includes a laser 202 that emits optical pulses 204. In an example embodiment, laser 202 is a laser diode and includes a back facet monitor (BFM) 203. Laser 202 is coupled to a time-multiplexing/demultiplexing optical system 206 having an input end 208A, an input/output end 208B, and a detector output end 208C. Optical system 206 receives input pulses 204 at input end 208A, splits each pulse into two time-multiplexed orthogonally polarized pulses P1 and P2 and outputs them at input/output end 208B. Likewise, optical system 206 also receives optical pulses at input/output end 208B, as described below.

A single-photon detector (SPD) unit 216 is coupled to optical system 206 at detector output end 208C. In an example embodiment, SPD unit 216 includes two SPDs 216A and 216B. A phase modulator (PM) 220 is coupled (e.g., by an optical fiber) to optical system input/output end 208B. An optical fiber 240 connects Bob to Alice at PM 220.

Bob also includes a controller 248 operatively (e.g., electrically) coupled to laser 202, BFM 203, SPD unit 216, and PM 220 to control the operation of these elements, as described below. In an example embodiment, controller 248 is or includes a programmable computer capable of performing instructions (e.g., "software") stored on a computer-readable medium 250. In an example embodiment, the instructions stored on the computer-readable medium 250 include methods according to the present invention as described below.

Alice

Alice includes a variable optical attenuator (VOA) 264 connected to optical fiber 240. A phase modulator (PM) 266 is arranged downstream of and is optically coupled to VOA 264. A Faraday mirror 270 is arranged downstream of and is optically coupled to PM 266.

Alice also includes a controller 288 operatively (e.g., electrically) coupled to PM 266 and VOA 264. In an example embodiment, controller 288 includes a programmable computer capable of performing instructions (e.g., "software") stored on a computer-readable medium 289. In an example embodiment, the instructions stored on the computer-readable medium 289 include methods according to the present invention as described below.

Controllers 248 and 288 are linked (e.g., electrically or optically) via synchronization link 290 to synchronize the operation of Alice and Bob. In particular, the operation of the laser 202, phase modulators 220 and 266, and SPD unit 216 are controlled and coordinated by controllers 248 and 288 relative to the launched optical pulse 204 using gating signals S0, S2, S3 and S1, respectively, when exchanging a quantum key between Alice and Bob. Thus, in an example embodiment, controllers 248 and 288 are considered as constituting a single controller for the QKD system.

QKD System Operation

With continuing reference to FIG. 1, in the operation of system 200, a laser gating signal S0 is sent by controller 248 to laser 202 to generate optical pulse 204. Optical pulse 204 is then divided into two separate pulses P1 and P2 by time-multiplexing/demultiplexing optical system 206. In an example embodiment, pulses P1 and P2 are relatively weak pulses, but can be strong pulses attenuated later at Alice prior to returning to Bob. The optical pulses P1 and P2 are passed out of optical system input/output end 208B to PM 220, which is gated to allow the pulses to pass therethrough unmodulated. Pulses P1 and P2 then pass to Alice over optical fiber 240. Pulses P1 and P2 continue to VOA 264, which can attenuate the pulses if necessary. The pulses then pass through PM 266 and are reflected by Faraday mirror 270, and then pass back through PM 266 a second time.

During one of the passes of pulses P1 and P2 through PM 266, the PM modulates one of the pulses—say, pulse P1—to form a phase-modulated pulse P1'. This is achieved by controller 288 sending a well-timed gating signal S1 that activates PM 266 for the short period of time (i.e., less than the time-separation between the pulses) when pulse P1 passes through PM 266. Pulses P1 and P2 then pass back through VOA 264, which can attenuate the pulses, if necessary, to ensure that photon signals (i.e., optical pulses having an average number of photons of one or less) are exchanged between Bob and Alice.

The pulses then pass back to Bob as photon signals and pass to PM 220. PM 220 is then directed to randomly modulate one of the pulses—say the remaining unmodulated pulse P2—with one of the select phase modulation values to form a modulated pulse P2'. This is achieved by controller 248 providing a well-time gating signal S2 to PM 220 that activates the phase modulator during the short time period within which pulse P2 passes through PM 220.

Now-modulated pulses P1' and P2' continue on to optical system 206. Optical system 206 combines the pulses to form a combined pulse P3. SPDs 216A and 216B are gated by a detector gating signal S3 and as such, are only active for a time equal to the width (i.e., gating interval) of the detector gating signal. If the combined pulse P3 arrives at one of the SPDs during the detector gating interval, SPD unit 216 outputs a signal to controller 248 that corresponds to the relative phases imparted to pulses P1 and P2 by PM's 266 and 206, respectively. In an example embodiment, one of detectors 216A and 216B receives the interfered pulse P3, depending on whether the interference is constructive or destructive. If the imparted phase is neither constructive nor destructive, pulse P3 winds up in either SPD with equal probability.

Once a desired number of photon signals are exchanged, the key is derived using standard techniques—for example, by Alice and Bob publicly comparing the basis of their measurements and only keeping the measurements (bits) corresponding to the same measurement basis. This forms the sifted key. Then, as described in pages 8-10 in the aforementioned article "Experimental quantum cryptography" by Bennett et al., the bit positions in the sifted key are permuted and the permuted key partitioned into blocks. Alice and Bob then test each block for parity and identify and discard the error bits. This process is iterated until the number of errors in the sifted key is satisfactorily reduced or eliminated, thereby establishing a secure quantum key. This process also allows for determining the BER, and is used in an example embodiment of the present invention to determine the BER in the methods described below.

The act of eavesdropping on optical fiber 240 by Eve intercepting or otherwise attempting to measure the weak optical pulses being transmitted between Bob and Alice will necessarily introduce errors in the key due to the quantum nature of the photons being exchanged. However, bit errors also arise from noise (e.g., detector dark current) or from the system not being properly calibrated. For example, if the timing of the activation of laser 202 or the gating of SPD unit 216 is not optimum, then pulses 204 will not be sent or detected at the proper time, which increases the BER.

Methods of Maintaining Optimum System Operation

Figure 2:
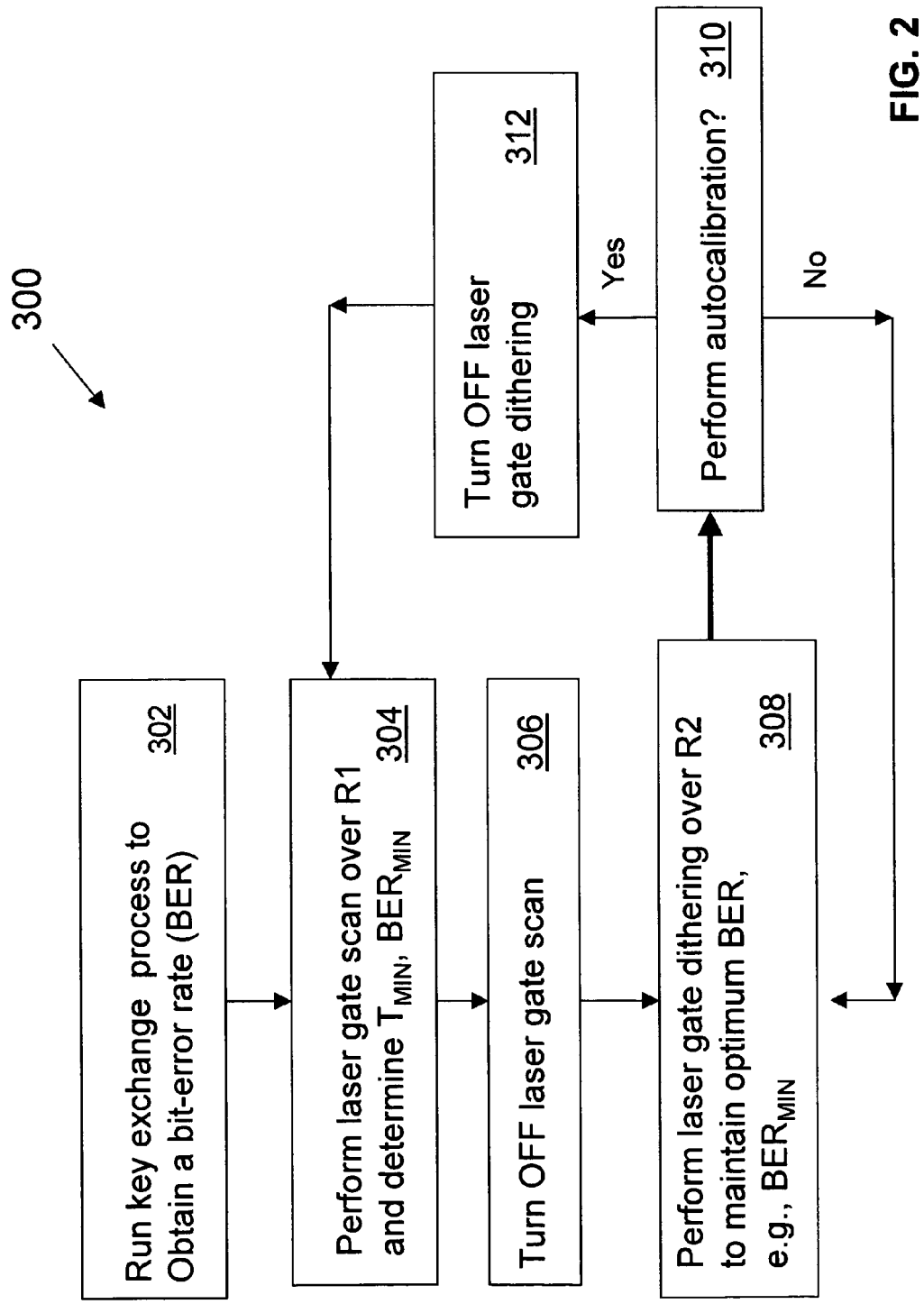
FIG. 2 is a flow diagram illustrating the laser autocalibration method, which includes scanning and dithering of the laser gating signal timing to optimize the BER while exchanging photon signals.

FIG. 2 is a flow diagram 300 of an example embodiment of the method of maintaining optimum system operation of a QKD system such as QKD system 200 of FIG. 1. The method involves performing both a laser gate scan and a laser gate dither in the manner described below.

In 302, the key exchange process is initiated by controller 248 sending laser gating signal S0 to laser 202, which in response thereto emits optical pulses-pulse 204 so that time-multiplexed optical pulses P1 and P2 can be sent from Bob to Alice. This process includes controller 288 instructing PM 266 via gating signal S1 to phase modulate one of the pulses, having the pulses travel back to Bob, modulating the remaining pulse, combining the modulated pulses, and detecting the combined pulse P3 in SPD unit 216. The process is carried out using multiple laser gating signals S0, multiple optical pulses 204 and multiple optical pulse pairs P1 and P2 for a time sufficient to form the sifted key and to establish a BER, as described above.

In 304, a laser gate scan is performed. This involves varying the timing (e.g., the arrival time T) of laser gating signal S0 over a selected range R1 of timing values to establish the optimum gate timing (arrival time) $T_{MIN}$ that yields an optimum BER, i.e., $BER_{MIN}$.

It is worth noting that in the case where SPD unit 216 includes two detectors 216A and 216B, it is typically a good presumption that drifts (e.g., thermal drifts) occurring in the SPD unit affect SPDs 216A and 216B to essentially the same extent, so that the two SPD drift together.

Figure 3:
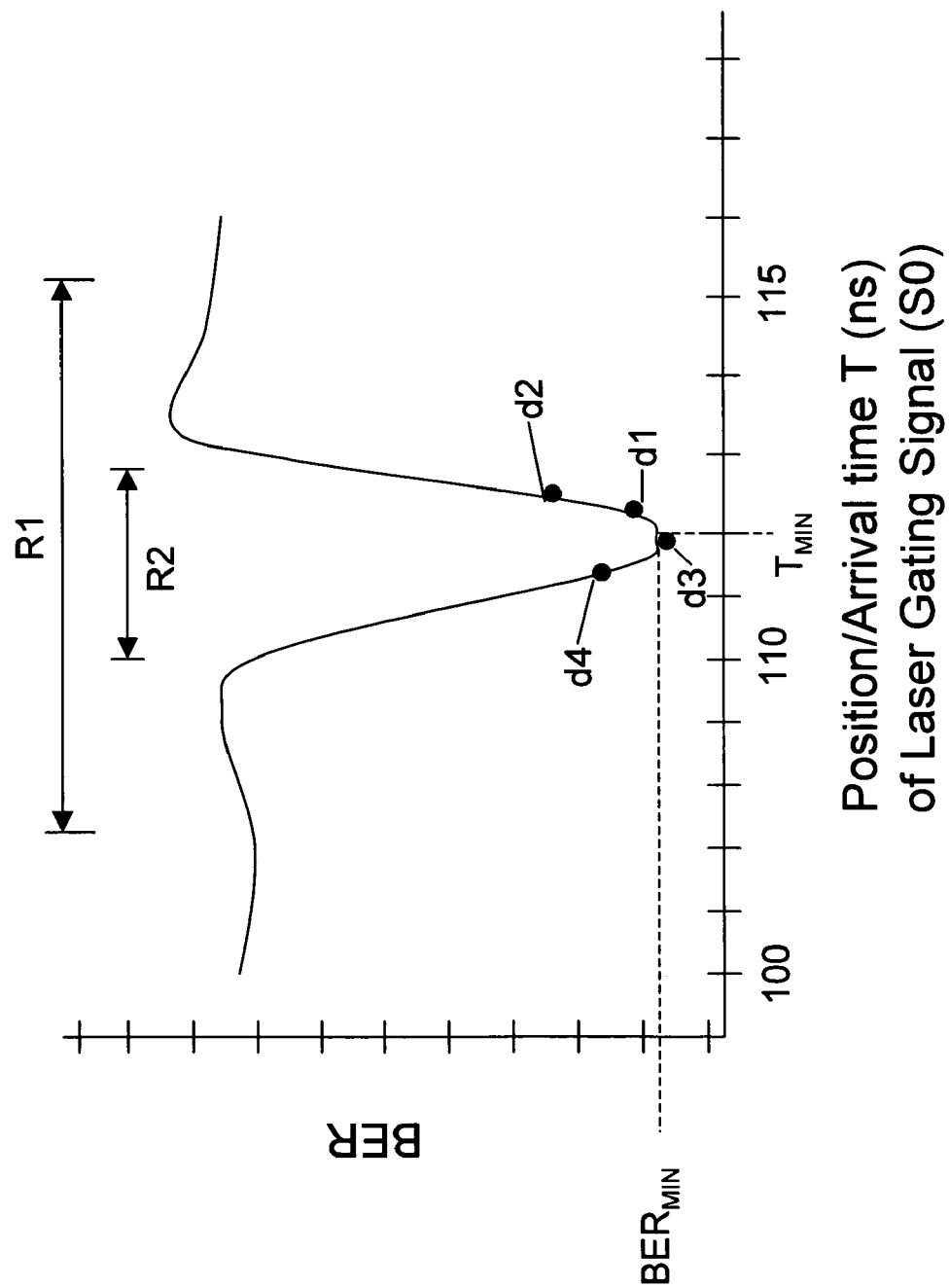
FIG. 3 is an example plot representing a single-photon laser gate scan for a QKD system such as that shown in FIG. 1, wherein the Y-axis is BER, and the X-axis is the timing (arrival time) T of the laser gating signal S0.

FIG. 3 is an example plot that represents the BER as a function of timing T of laser gating signal S0 for a laser gate scan and for a laser gate dither. The X-axis represents the relative timing (e.g., arrival time T) of the laser gating signal S0 at laser 202, which is varied to find a timing $T_{MIN}$ that corresponds to an optimum (e.g., minimum) bit-error rate $BER_{MIN}$. In the context of the present invention, the $BER_{MIN}$ corresponds to optimum system performance because it corresponds to the highest data transmission rates and highest photon signal sensitivity level vs. timing, with no increase in dark current counts. Likewise, in an example embodiment of the present invention, an optimum photon signal timing is one that optimizes the BER, while maintaining a smooth detector response that allows for laser gate dithering, as described below.

The curve in FIG. 3 is obtained by incrementing the arrival time T of the laser gating signal S0 over a timing range R1 of timing values T (X-axis) and running the QKD system to obtain a BER value. In an example embodiment, the arrival time T corresponds to the position of the leading edge of the laser gating signal relative to a reference, e.g., a clock reference time provided by controller 248.

Once $T_{MIN}$ and $BER_{MIN}$ are determined, then the process proceeds to 306, wherein the laser gate scan is terminated (i.e. is turned OFF).

In 308, laser gate dithering is performed. This involves repeatedly changing the timing (e.g., arrival time T) of the laser gating signal S0 by small amounts within a timing range R2 around the arrival time $T_{MIN}$ (i.e., the laser gating signal is "dithered") and observing a, change in the BER. If necessary, the arrival time T is shifted from its original optimum value $T_{MIN}$ to a new optimum value $T'_{MIN}$ so that the BER is maintained at an optimum value of $BER_{MIN}$ (or alternatively, to a new optimum BER of $BER'_{MIN}$). Note that the timing range R2 is smaller than the timing range R1 (i.e., R2<R1) and surrounds a relatively small range about $T_{MIN}$.

In an example embodiment, the timing range R2 is selected to be small enough to keep a security attacker (e.g., Eve) from leading the timing off to an undesirable location, yet large enough to allow for the dithering process to be successful, i.e., to cause changes in the BER that allow for maintaining the BER at or near $BER_{MIN}$.

With reference again to FIG. 3, four data points d1, d2, d3 and d4 on the curve are highlighted for the sake of illustration. Assume the data point d1 is measured first, then the data point d2 associated with a greater arrival time T is measured. Since the BER associated with d2 is greater than that associated with d1, the arrival time T of the laser gating signal S0 is decreased. The BER for the laser gating signal position (timing) associated with data point d1 is re-measured. Since the BER associated with the second data point d1 is smaller than that associated with data point d2, the arrival time T is further decreased and the BER measured. The result is data point d3, which has a smaller BER than for data point d1. The arrival time T is thus decreased again, this time yielding the higher BER associated with a data point d4. Since this measurement is greater than that for d3, the arrival time T of the laser gating signal S0 is increased, but not so much that it returns to the value associated with data point d2.

In this manner, the laser gating signal timing is varied back and forth ("dithered") about $T_{MIN}$ to maintain a minimum (or near-minimum) BER. Thus, during normal operation of SPD unit 216, the laser gate dither process keeps the single-photon sensitivity high. The frequency of laser gate dithering is only limited by the rate at which a satisfactory number of photon signals can be exchanged, and by the processing speed of the controller in calculating the BER from the exchanged photon signals.

In 310, the choice of performing an autocalibration of the laser gating signal S0 by initiating another laser gate scan is presented. If such autocalibration is desired or otherwise deemed necessary, then the method proceeds to 312. In 312, the laser gate dither is turned OFF and the process returns to the laser gate scan of 304 to perform an updated calibration of the laser gate timing to find a new optimum arrival time $T_{MIN}$. This updated calibration may need to be performed for a variety of reasons, such as a detected change in the environment or because of normal system drifts.

In an example embodiment, autocalibration of the QKD system is performed when any of the following conditions occur: a) a change in photon count levels or BER outside of statistical limits, b) ambient temperature changes greater than a predetermined amount such as 0.5° C. occur, c) the optical path has changed configuration, as through a switching network element, different from event a), as in a message of a pending event will be sent before the change in photon count levels, d) on a daily schedule due to known daily temperature cycling, and e) on a fixed time basis, such as every hour, whether needed or not.

The need to turn OFF the laser gate dither prior to performing the laser gate scan arises because the two processes can interfere with one another. Specifically, while the laser gate scan tries to increment the timing of the laser gating signal S0 in a smooth (i.e., incremental) fashion, the laser gate dither tries to adjust the variable back and forth over small increments in order to stay on the optimum BER of $BER_{MIN}$. Consequently, the two competing processes can produce spurious results. Thus, following a scan and update of the laser gating signal parameters during the laser gate scan of 304, the laser gate dither is automatically (or alternatively, is manually) turned back ON.

If there is no desire or need to perform the autocalibration, then the method remains in the laser gate dither process of 308, which as mentioned above is repeated, e.g., every second or so. The periodic laser gate dither process generally results in slight changes of the value of $T_{MIN}$ (say, from $T_{MIN}$ to $T'_{MIN}$ to $T''_{MIN}$, etc.) in order to maintain the BER at $BER_{MIN}$, or alternatively to maintain $BER_{MIN}$ at new corresponding minimum values, say $BER'_{MIN}$, $BER''_{MIN}$, etc.

For the sake of clarity and simplicity, in the present invention, "minimum BER" can mean $BER_{MIN}$, $BER'_{MIN}$, $BER''_{MIN}$, etc. Likewise, the "optimum arrival time $T_{MIN}$" can change, and so in the present invention can mean $T_{MIN}$, $T'_{MIN}$, $T''_{MIN}$, etc. Likewise, "minimum BER" is used herein to refer generally to a figure of merit that is based on measuring the bit-error rate during the QKD process, e.g., using standard BER-measuring and BER-correction procedures.

In an example embodiment, one or more of the methods of the present invention is/are embodied in at least one of computer readable medium 250 and 289 and is executed by at least one of controllers 248 and 288.

While the present invention has been described in connection with preferred embodiments, it will be understood that it is not so limited. On the contrary, it is intended to cover all alternatives, modifications and equivalents as may be included within the spirit and scope of the invention as defined in the appended claims

What is claimed is:

1. A method of autocalibrating a quantum key distribution (QKD) system having two operably coupled encoding stations and a laser in one of the stations by using a bit-error rate, the method comprising:
   a) performing laser gate scanning by sending laser gating signals to the laser and varying a laser gating signal arrival time T over a first range R1 to determine an optimum arrival time that corresponds to an optimum bit-error rate for photon signals generated by the laser in response to the laser gating signals and exchanged between the two encoding stations; and
   b) performing laser gate dithering by varying the laser gating signal arrival time T over a second range R2 surrounding the optimum arrival time to maintain the bit-error rate at or near the optimum bit-error rate.

2. The method of claim 1, wherein the optimum bit-error rate is a minimum bit-error rate.

3. The method of claim 1, including:
   terminating the laser gate dithering and performing another laser gate scanning.

4. The method of claim 1, wherein the QKD system includes a programmable controller and a computer readable medium, wherein the laser gating signal is provided by the controller, and wherein the method is embodied in the computer readable medium such that the controller directs the QKD system to carry out acts a) and b).

5. A non-transitory computer-readable medium having instructions embodied therein to direct a computer in a quantum key distribution (QKD) system having first and second encoding stations and a laser to perform the following method of autocalibrating the QKD system by using bit-error rate, comprising: a) performing a laser gate scan by sending laser gating signals to the laser and varying an arrival time T of the laser gating signals over a first range R1 to determine an optimum arrival time that corresponds to an optimum bit-error rate for photon signals generated by the laser in response to the laser gating signals and exchanged between the two encoding stations; and b) performing laser gate dithering by varying the arrival times T of the laser gating signals over a second range R2 surrounding the optimum arrival time to maintain the bit-error rate at or near the optimum bit-error rate.

6. The non-transitory computer-readable medium of claim 5, wherein the optimum bit error rate is a minimum bit-error rate.

7. A method of exchanging a key in a quantum key distribution (QKD) system having first and second operably coupled encoding stations, with one of the encoding stations having a laser operably coupled to a controller, the method based on a bit-error rate and comprising:
exchanging photon signals between the first and second encoding stations where the photon signals are generated by the laser in response to laser gating signals from the controller;
performing a first laser gate scan by sending the laser gating signals from the controller to the laser over a range R1 of laser gating signal arrival times T;
establishing from the first laser gate scan a first optimum arrival time for the laser gating signals corresponding to a first minimum bit-error rate;
terminating the first laser gate scan when the first optimum arrival time is established; and
performing a first laser gate dither by altering the arrival times T over a range of arrival times R2 about the first optimum arrival time to either a) maintain the bit-error rate at or near the first minimum bit-error rate or b) establish a new minimum bit-error rate.

8. The method of claim 7, wherein performing the laser gate dither results in a new optimum arrival time associated with the new bit-error rate.

9. The method of claim 7, further including:
terminating the performing of the first laser gate dither;
performing a second laser gate scan;
terminating the second laser gate scan; and
performing a second laser gate dither.

10. The method of claim 7, further including terminating and repeating the first laser gate dither periodically so as to perform a series of laser gate dithers.

11. A non-transitory computer-readable medium having instructions embodied therein to direct a computer in a quantum key distribution (QKD) system adapted to control the operation of the QKD system to perform the following method of autocalibrating the QKD system based on a bit-error rate, comprising: sending photon signals between operably coupled encoding stations in the QKD system, wherein the photon signals are generated by a laser in response to laser gating signals having arrival times T at the laser; performing a first laser gate scan by varying the arrival times T over a range of arrival times R1 to establish a first optimum arrival time corresponding to a first minimum bit-error rate; terminating the first laser gate scan when the first optimum arrival time is established; and performing a first laser gate dither altering the arrival times T over a range of arrival times R2<R1 about the first optimum arrival time to either a) maintain the first minimum bit-error rate, or b) establish a new minimum bit-error rate.

12. A method of autocalibrating a quantum key distribution (QKD) system having first and second operably coupled encoding stations, with one of the encoding stations having a laser operably coupled to controller, comprising:

generating photon signals with the laser by activating the laser with laser gating signals sent from the controller, the laser gating signals having an associated laser gating signal timing T;
sending the photon signals between the operably coupled encoding stations to establish a bit-error rate;
performing a laser gate scan to determine an optimum arrival time $T_{MIN}$ of the laser gating signals corresponding to a first optimum bit-error rate;
terminating the first laser gate scan when $T_{MIN}$ is established; and
periodically dithering the laser gating signal timing about the optimum arrival time to either a) maintain the bit-error rate at or near the first optimum bit-error rate, or b) establish a second optimum bit-error rate.

13. The method of claim 12, further including:
terminating the laser gating signal dithering; and
performing another laser gate scan.

14. A method of autocalibrating a quantum key distribution (QKD) system having operably coupled first and second encoding stations, and a laser operably coupled to a controller in one of the encoding stations, the method comprising:
providing laser gating signals from the controller to the laser to cause the laser to generate photon signals;
establishing an optimum arrival time of the laser gating signals that corresponds to an optimum bit-error rate when exchanging photon signals between the encoding stations;
terminating the laser gate scan; and
varying the arrival times of the laser gating signals around the optimum arrival time to provide minor adjustments to the arrival time of the laser gating signals to maintain the bit-error rate at or near the optimum bit-error rate.

15. The method of claim 14, wherein the optimum bit-error rate is a minimum bit error rate.

16. The method of claim 1, wherein the photon signals are phase-encoded by a first phase modulator in one encoding station and a second phase modulator in the other encoding station.

17. The method of claim 1, further including:
encoding a first photon signal in one encoding station;
encoding a second photon signal in the other second encoding station;
interfering the first and second encoded photon signals in one of the encoding stations to form a combined pulse; and
detecting the encoded photon signals by detecting the combined pulse.

18. The method of claim 12, including generating the photon signals and detecting the encoded photon signals in the same encoding station.

19. The method of claim 14, including generating the photon signals and detecting the encoded photon signals in the same encoding station.

20. The method of claim 14, further including:
encoding a first photon signal in the first encoding station;
encoding a second photon signal in the second encoding station;
interfering the first and second encoded photon signals to form a combined pulse; and
detecting the encoded photon signals in one of the first and second encoding stations by detecting the combined pulse.

* * * * *